(12) United States Patent
Bellamy, Jr. et al.

(10) Patent No.: US 6,259,907 B1
(45) Date of Patent: Jul. 10, 2001

(54) SYSTEM AND METHOD OF RETRIEVING AND FORMATTING DATA FROM CELLULAR TELEPHONE SWITCHES

(75) Inventors: Gary Wayne Bellamy, Jr., Alpharetta, GA (US); Mathew John Tobey, Tampa; Roger Brian Lavender, Tarpon Springs, both of FL (US)

(73) Assignee: GTE Wireless Service Corporation, Alpharetta, GA (US)

( * ) Notice: Subject to any disclaimer, the term of this patent is extended or adjusted under 35 U.S.C. 154(b) by 0 days.

(21) Appl. No.: 09/451,599

(22) Filed: Nov. 30, 1999

(51) Int. Cl.$^7$ ...................................... H04M 3/00
(52) U.S. Cl. ...................... 455/410; 455/408; 455/455
(58) Field of Search .................... 455/410, 411, 455/419, 422, 466, 566, 567, 445, 408, 405, 67.1, 67.7, 409; 380/247, 248, 270; 379/112, 113, 133, 136

(56) References Cited

U.S. PATENT DOCUMENTS

| | | | |
|---|---|---|---|
| 5,345,595 | * | 9/1994 | Johnson et al. ...................... 455/33.1 |
| 5,353,331 | * | 10/1994 | Emery et al. ........................... 379/58 |
| 5,615,408 | * | 3/1997 | Johnson et al. ...................... 455/33.1 |
| 5,655,019 | * | 8/1997 | Mckerman et al. ...................... 380/6 |
| 5,778,315 | * | 7/1998 | Proietti ................................. 455/419 |
| 5,862,475 | * | 1/1999 | Zicker et al. ......................... 455/419 |
| 5,953,653 | * | 9/1999 | Josenhans et al. .................... 455/410 |
| 6,061,558 | * | 5/2000 | Kennedy, III et al. ............... 455/411 |
| 6,064,875 | * | 5/2000 | Morgan ................................ 455/410 |
| 6,070,070 | * | 5/2000 | Ladue ................................... 455/419 |
| 6,148,197 | * | 11/2000 | Bridges et al. ....................... 455/432 |

* cited by examiner

Primary Examiner—Edward F. Urban
Assistant Examiner—Marceau Milord
(74) Attorney, Agent, or Firm—James K. Weixel

(57) ABSTRACT

A method and system is provided for automatically retrieving cellular telephone data for analysis of call data associated with cellular telephone calls. Such method and system ensure reliable retrieval and reporting of information from cellular telephone switches for use in analyzing cellular telephone technology and data deployed in various regions of the country serviced by a service provider. Such system and method automatically download cellular telephone data from cellular switches of a telephone network at predetermined time periods. The cellular telephone data pertains to cellular calls routed through the switches. Certain elements of the cellular telephone data is chosen for storage in a central database and is reformatted for placement in tables in the central database. The tables have a format that enables the cellular telephone data to be selectively chosen for inclusion in various documents that summarize the cellular telephone data that is downloaded.

16 Claims, 8 Drawing Sheets

SYSTEM AND METHOD OF RETRIEVING AND FORMATTING DATA FROM CELLULAR TELEPHONE SWITCHES

TECHNICAL FIELD

The present invention relates to a method and system for managing data related to cellular telephone operations, and more particularly, relates to a method and system for the retrieval and processing of data from a cellular telephone switch.

BACKGROUND OF THE INVENTION

Cellular telephone use is rapidly expanding throughout the world and particularly in the United States. Many telephone companies offer cellular telephone services in various regions of the country and, unfortunately, this type of communication is subject to fraud and theft by unauthorized users. During cellular telephone operation, cellular telephones transmit a mobile identification number (MIN) identifying the cellular network to which the cellular telephone belongs and an electronic serial number (ESN) identifying the particular cellular telephone being used. The identification numbers are often intercepted by unauthorized individuals who use the identification information associated with the cellular telephones to clone the telephones.

In order to combat cellular telephone fraud, cellular telephone service providers employ various methods and technologies to authenticate, fingerprint, or otherwise protect the services offered by the companies from unauthorized use. The methods employed by the service providers vary, particularly for different regions of the country. The providers find it difficult to manage the various types of technologies deployed and the information associated with the technologies for each of the regions serviced and for the large number of customers serviced. The information that plays a significant role in making management decisions with respect to the technology or servicing customer service calls is contained in the cellular switches of the various regions where cellular service is provided. For example, when a cellular telephone call is initiated through a cellular telephone switch, data packets containing information regarding the authentication, electronic fingerprinting or other security measures are collected at the switches through which the cellular telephone calls are processed. While this information is valuable to service providers in making deployment decisions about certain technologies or servicing customers, obtaining accurate, current information from the switches is often difficult.

Information regarding the various technologies deployed for cellular telephone service and tracking information regarding particular telephone calls are gathered and calculated manually from cellular switches by individuals responsible for the collection of information for particular service regions. Information retrieved by these individuals is typically imparted to customer service representatives or those responsible for generating reports by using rudimentary techniques, such as e-mail or memorandums.

These rudimentary techniques of tracking information that is pertinent to the overall management of cellular operations that expand over various regions of a country have numerous disadvantages. One disadvantage is the reliability of the information. Particularly, a summation of the information for a particular service provider is dependent upon multiple contacts who need to update the information regularly. With multiple contacts responsible for updating the information, obtaining consistent and timely reports is often difficult. Furthermore, if the individual responsible for obtaining the data from the cellular switches and creating the reports is not available, the integrity or timeliness of the information processed by another may be substandard. The collection of the information and organization of the information by the individuals is a difficult, time consuming and tedious task. Additionally, the collected information must be distributed to the proper departments or individuals responsible for analyzing or viewing the information. Thus, consolidating reports from various sources for analysis by different individuals or departments of a telephone company can be difficult. Due to the time consuming process of gathering the information and interpreting the switch information, current consistent information regarding the cellular service is often not readily available to departments or individuals of the company who need information to resolve troubleshooting or specific technology issues.

Thus, there is a need for a method or system for ensuring accurate and reliable retrieval and reporting of information from cellular telephone switches for use in analyzing cellular telephone technology and data deployed in various regions of the country serviced by a service provider.

SUMMARY OF THE INVENTION

Generally described, the present invention provides a method and system for automatically retrieving cellular telephone data for analysis of call data associated with cellular telephone calls. Such methods and systems ensure reliable retrieval and reporting of information from cellular telephone switches for use in analyzing cellular telephone technology and data deployed in various regions of the country.

A system and method consistent with the invention automatically downloads cellular telephone data from cellular switches of a telephone network at predetermined time periods. The cellular telephone data pertains to cellular calls routed through the switches. Certain elements of the cellular telephone data are chosen for storage in a central database and are reformatted for placement in tables in the central database. The tables have a format that enables the cellular telephone data to be selectively chosen for inclusion in various documents that summarize the cellular telephone data that is downloaded.

The cellular telephone data may be automatically downloaded to a temporary data storage facility and the temporary data storage facility may be searched for files that contain information that is to be stored in the central database. The information may be retrieved from the temporary data storage facility and may be analyzed to determine whether the information stored in the temporary storage facility is formatted properly. The properly formatted information is stored in cellular information tables in the central database. If the properly formatted information represents changes to data that was previously stored in the cellular information tables, this changed information is stored in changed information tables. The information contained in the cellular information tables may be displayed in response to a request initiated by a user. The user request is compared to queries stored in query tables stored in the central database and a query that corresponds to the request is selected. The tables are searched using the corresponding query and the tables corresponding to the located query are displayed.

In another implementation consistent with the present invention, a system for collecting cellular telephone data from cellular telephone switches for access by users includes a first database system operative to execute instructions to periodically retrieve cellular telephone data stored in a first format as transmitted through cellular telephone switches associated with a cellular telephone network. The first database system is operative to store the retrieved cellular telephone data to files. A second database system is operative to initiate a search of stored files to retrieve selected files and is operative to store retrieved selected files in a second format that is customized for display of reports that summarize the cellular telephone data.

DESCRIPTION OF THE PREFERRED EMBODIMENTS

Reference will now be made in detail to one or more embodiments of the present invention as illustrated in the accompanying drawings. The same reference numbers may be used throughout the drawings and the following description to refer to the same or like parts.

A. Overview

A system or method consistent with the present invention is useful in retrieving cellular telephone data, such as data used for analyzing, preventing, and detecting fraud or unauthorized use associated with cellular telephone calls. Such systems or methods automatically download cellular telephone data from cellular telephone switches at predetermined time periods, where the cellular telephone data pertains to calls routed through the switches. Certain elements of the cellular telephone data may be selectively chosen for storage in a central database and the cellular telephone data may be reformatted for placement in selected tables in a central database. The tables may have a format that enables cellular telephone data to be retrieved therefrom in a manner that enables the data to be presented in an easily understood format for individuals not having training in analyzing the underlying raw data retrieved from the switches.

Figure 1:
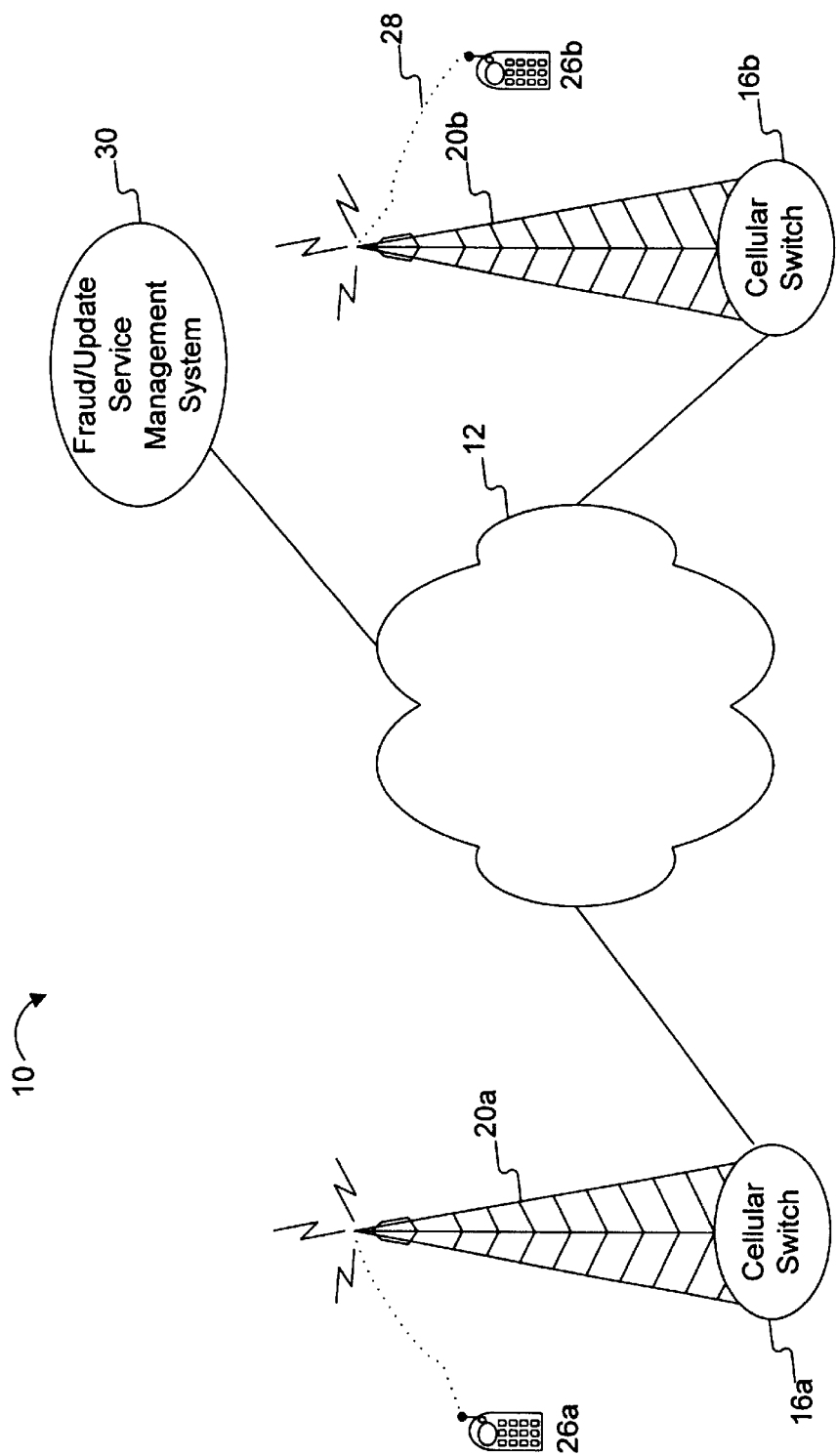
FIG. 1 is a telephone system in which systems and methods consistent with the present invention may be employed.

FIG. 1 shows a cellular telephone system in which systems and methods consistent with the present invention may be employed. As shown, system 10 includes telephone company networks 12 for various geographic regions. The telephone company networks 12 are coupled to cellular sites or cellular switches 16a and 16b. The cellular switches 16 are coupled to cellular antennas 20a and 20b, respectively, for the communication of wireless signals 28 to and from cellular telephones 26a and 26b operated by users or customers of a telephone company associated with the telephone networks 12. Wireless communication signals 28 received at the antennas 20 from the cellular telephones are converted to land line based signals for communication via the telephone networks 12. It should be appreciated that the cellular switches 16a and 16b and cellular telephones 26a and 26b are representative of the vast number of cellular switches, cellular telephones, and other devices associated with the telephone networks 12.

The wireless communication signals 28 contain data packets of information that identify the cellular telephone that is communicating with the cellular switches 16. The data packets, transmitted as part of the wireless communication signals 28, contain information that identify the cellular telephone, cellular encoding or encryption information, and other information that is utilized by the cellular telephone service provider to help detect fraud in the operation of the cellular telephones 26. The cellular switches 16a and 16b store or collect information transmitted from the cellular telephones 26a and 26b during each call initiated to or from cellular telephones 26a and 26b. The information collected at the cellular switches 16 is very useful to the cellular telephone service provider for detecting fraud or unauthorized use of a cellular telephone 26, and for making management decisions regarding the deployment of cellular technologies.

By utilizing a system consistent with the present invention, a telephone service provider may more easily retrieve and analyze information related to cellular telephone data collected at cellular switches and collected from other sources. A system consistent with the present invention enables an efficient system for retrieving information from cellular switches, centralizing the information at a service center and formatting the information for efficient querying and analysis by the various individuals of a company who may desire to view the information. The information is processed and maintained for analysis at a fraud/update service management system (SMS) 30.

The SMS 30 includes a database that unifies and consolidates cellular fraud data and related technologies utilized by a cellular telephone service provider. An interface is associated with the database to convey information and vital statistics to groups or departments of a telephone company that need to utilize the information. The information of the database is stored in tables that are used to display the information to a user directly from the tables. Report documents or structures are defined to assist in consolidating information from the various tables or queries for display in a consolidated, concise, easy to read format.

B. Architecture of System

Figure 2:
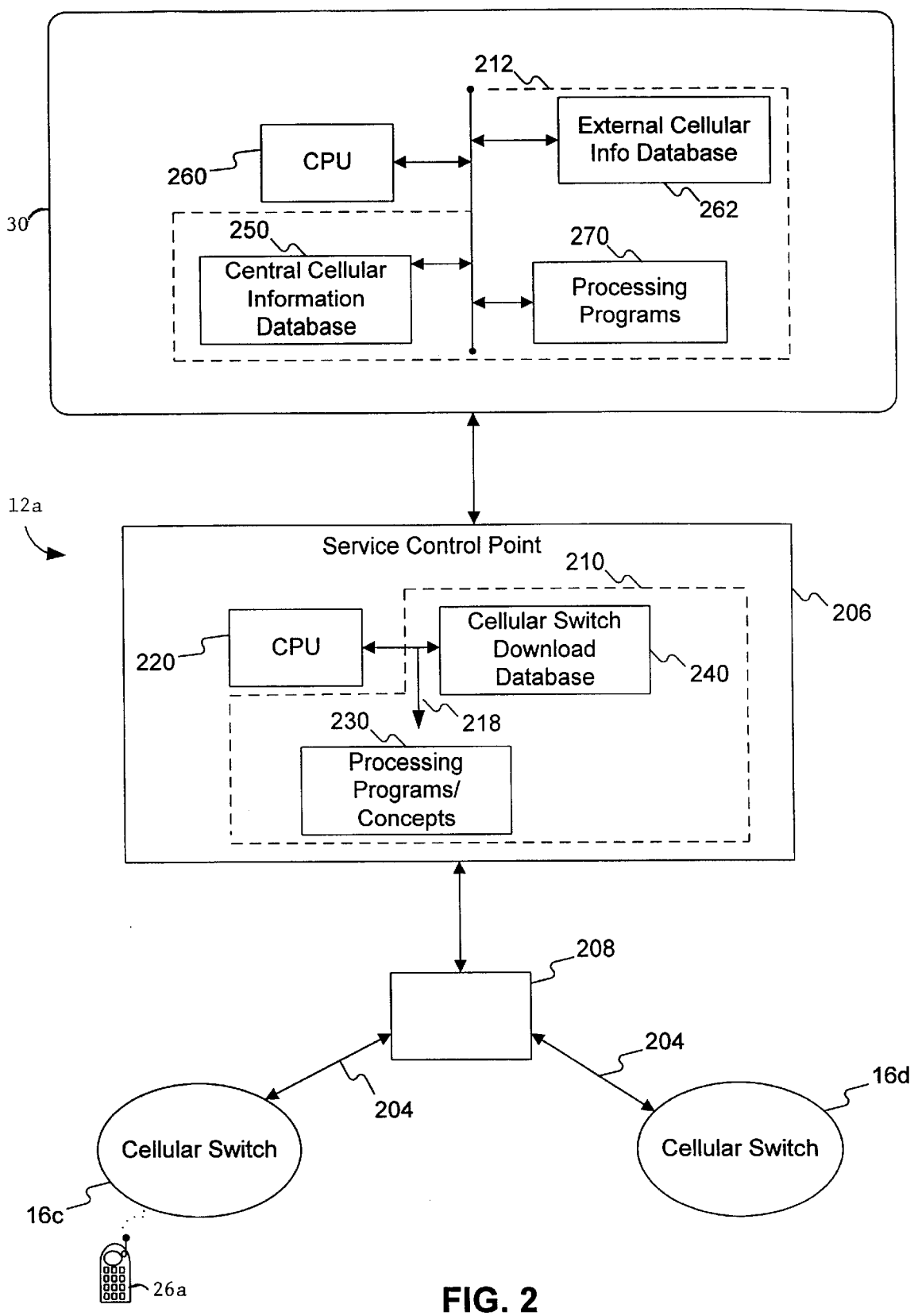
FIG. 2 is a more detail diagram of a particular telephone network of the system of FIG. 1 in which systems and methods consistent with the present invention may be employed.

FIG. 2 shows a switching system of one local telephone network 12a consistent with an implementation of the present invention. The description associated with FIG. 2 provides a more detailed discussion of the components of the telephone system 10 and the processes implemented at a local telephone network central office. As those skilled in the art will understand, a telephone 26a of a calling party communicates with a cellular service switching point (CSSP) 16c at a central office. The service switching points are connected by Signaling System 7 (SS7) data links 204 to a service control point 206. A signal transfer point (STP) 208 may be provided between the service switching points 16c and 16d and service control point (SCP) 206 along the SS7 data links 204. The STP 208 routes call processing queries between the CSSP 16c and 16d and the service control point 206. In setting up a call from the telephone 26a to a destination location, the CSSP 16c communicates with the service switching point, such as CSSP 16d, associated with the destination location via digital data communication channel 204. When the call is routed, a communication path is set up between the telephone 26a and destination location. Of course, it will be understood by those skilled in the art that other network devices may be involved in the communication of the call set up.

The communications between the cellular telephones 26 and the cellular service switching points and the communications between network components employ data packet communication. The data packets have signal information fields that includes user specific data and other calling processing information. The data packets communicated between the cellular telephones 26 and the CSSPs include routing information, customer identification information, and fraud prevention/detection information, such as authentication and RF fingerprinting information, as known to those skilled in the art. This information contained in the data packets is interpreted and recorded at the CSSPs for each call communicated through the CSSPs. The data packets communicated between network components include routing labels, certain control and sequence numbers, the uses and designations of which are known to those skilled in the art familiar with SS7 protocol that is employed in the telephone networks 12.

Some of the processes and the basis for many of the features of the network reside in the local service control point 206, which is associated with CSSPs, and a service management system 30 that houses a central database consistent with the present invention. As is known to those skilled in the art, service control points and service management systems associated with telephone networks include powerful computer systems. In order to keep the processing of data and calls as simple and generic as possible at switches, such as a cellular service switching point, a relatively small set of triggers are defined at the CSSP at particular points in call processing. A trigger at a cellular service switching point is an event encountered at some point in call processing that causes the cellular service switching point to suspend call processing and to generate a data packet to be sent to the service control point 206 to determine a customized feature to be provided.

Computer programs used to implement methods consistent with the present invention are located in memory units 210 and 212 and the processes of the present invention are carried out through the use of central processing units (CPUs) 220 and 260 in conjunction with application programs and modules of the SCP 206 and SMS 30, respectively. Those skilled in the art will appreciate that the memory units are representative of read-only memory, random access memory, and other memory elements used in a computer system. The memory units 210 and 212 of the SCP 206 and SMS 30 contain databases, tables, and files that are used to carry out the rocesses associated with the present invention. CPUs, 220 and 260, in combination with computer software and an operating system, control the operations of the computer systems. The memory units, CPUs, and other components of the computer system communicate via buses 218 and 258 of the SCP and SMS, respectively. Data or signals resulting from the processes consistent with the present invention are output from the computer system via input/output interfaces.

The SCP 206 includes a processor 220, processing programs/scripts 230, and a cellular switch download database 240. The processing programs/scripts are executed and cause data from the cellular switches 16 to be periodically downloaded to the cellular switch download database 240. The scripts may execute file transfer protocol clients. The scripts tell the database the specific time at which to execute the download functions, what data to extract from various locations within the cellular switches, and where to place that data within the cellular switch download database. The scripts initiate a file transfer protocol (FTP) within the database and direct the databases retrieval operations to the specified data. For example, the SCP 206 can be programmed to cause the cellular information to be downloaded at a certain time on a specified day of the week. The raw cellular information downloaded to the cellular switch download database 240 may be retrieved and stored in the central cellular information database 250 of the SMS 30. The raw cellular information is generally referred to herein as the form of cellular data as stored at the switches when information is initially collected from cellular calls. A form of raw cellular data is NNBR as known to those skilled in the art. The NNBR contains data that refers to fraud technologies that are active in the cellular switch. The central cellular information database 250 stores cellular telephone information in tables in a standardized format (e.g. tables having the same number of columns and having the same type delimiters separating fields/columns), regardless of the switch, geographic region associated with the switch or form of the data stored at the switch. The tables may be accessed by a user to obtain knowledge regarding the cellular fraud technologies processed at the cellular switches.

The SMS 30 may receive information regarding cellular fraud technology from an external source, such as by e-mail or other file transfer systems. This information is stored in an external cellular information database 262. The information stored in the external cellular information database 262 is accessed and stored in the central cellular information database 250 during updates of the central cellular information database. The SMS 30 has processing programs 270 that include scripting programs and an emulator to automate the retrieval of information from the cellular switch download database 240 and the external cellular information database 262. The central cellular information database uses scripting, such as visual basic, to retrieve data from the cellular switch download database 240. The function of these scripts is to activate an emulator program, search and check for valid data formats, as defined for the system, and log any errors encountered, direct the File Transfer Protocol within the emulator to download data, and then close the emulator application. The emulator is a program that allows Microsoft Windows based computers to interface with other various operating systems, where the cellular switch database resides. These programs 270 also perform filtering and analysis operations on data of the central cellular information database 250, as discussed herein.

It should be appreciated by those skilled in the art that, although only one service control point 206 is illustrated in FIG. 2 and only two cellular switches are illustrated, multiple networks including service control points 206 and cellular switches 16 in therefor various geographic areas may utilize the same processes and programs associated with the elements illustrated in FIG. 2. The information obtained from cellular switches and external cellular information databases from various telephone networks associated with different geographic regions are all stored in a central cellular information database 250 for the telephone company to aid in customer service and administration of the telephone services provided by the telephone company.

Figure 3:
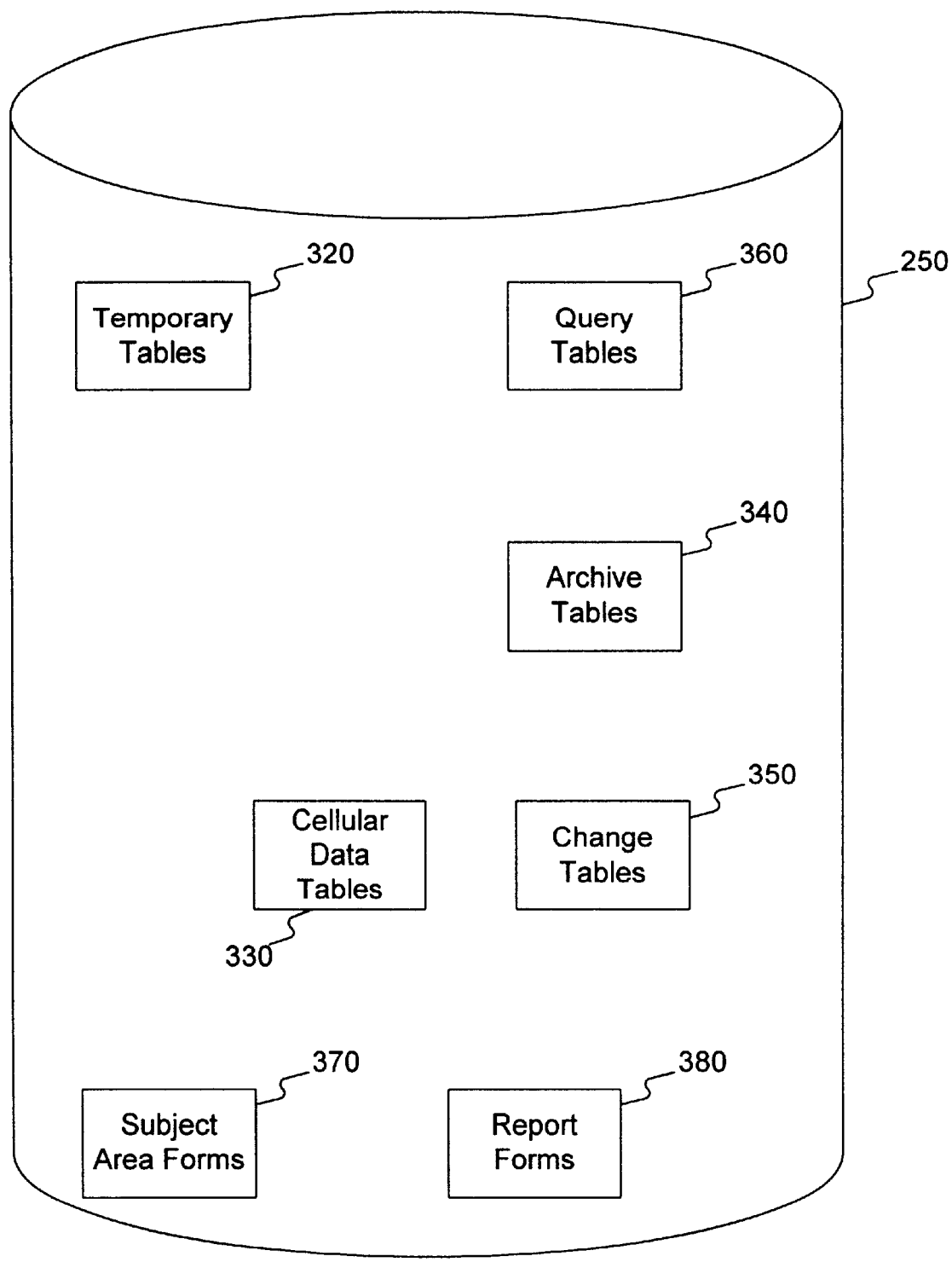
FIG. 3 is a diagram of a central database consistent with an implementation of the present invention.

The central cellular database 250 is illustrated in more detail in FIG. 3. The central cellular database 250 utilizes various tables for storing information associated with the fraud technologies employed by the various regions serviced by the different divisions of the telephone company. The central cellular information database 250 includes temporary tables 320 which initially receive information from the cellular switch download database 240 for initial processing. After the information is loaded in the temporary tables 320, the format of the file/data is checked to determine whether the data is in the format defined for the system. For example, the file may be checked to determine if the file is a text file or a Microsoft Excel file, whether the file contains the appropriate delimiters, or whether a file contains data. After the information is validated for formatting and filtered to store information to be accessed by users, the information is stored in cellular data tables 330.

The information from the temporary tables 320 replaces the information in the cellular data tables 330 each time the data is downloaded. Archive tables 340 contain a duplicate copy of the information downloaded from the temporary tables 320 to the cellular data tables 330 at each periodic download. The archive table information is maintained for a predetermined period, e.g., three months, after which the information is deleted. A change table 350 records the changes to data that have occurred since the previous download of information from the cellular switches 16. The central cellular information database 250 should be adaptable so that changing technologies or information can be updated for this database in an efficient manner. The system or method consistent with the present invention enables changes to be incorporated into the database by placing all queries in query tables 360. Thus, as queries need to be modified to accommodate changes in data, simple changes or additional queries can be built into the query tables 360.

Additionally, subject area forms 370 are created and stored in the database that organize the data of the tables for display in an easily readable format. The forms define fields and codes to structure the data from the tables in a user or administrator defined format. These forms provide the user with an interface that provides specific search criteria. These forms also display the results of these searches in an easy to read format. Report forms 380 are also defined in the database and these report forms have fields or codes defined to consolidate the subject area forms so as to produce reports covering various subject areas. Searches for the specified data occurs via the form. The searched data is displayed on the form. The user will press a button that will tell the database to print a report based on the data in a predetermined format. This format can be either in hard copy or soft copy.

C. Architectural Operation

Figure 4:
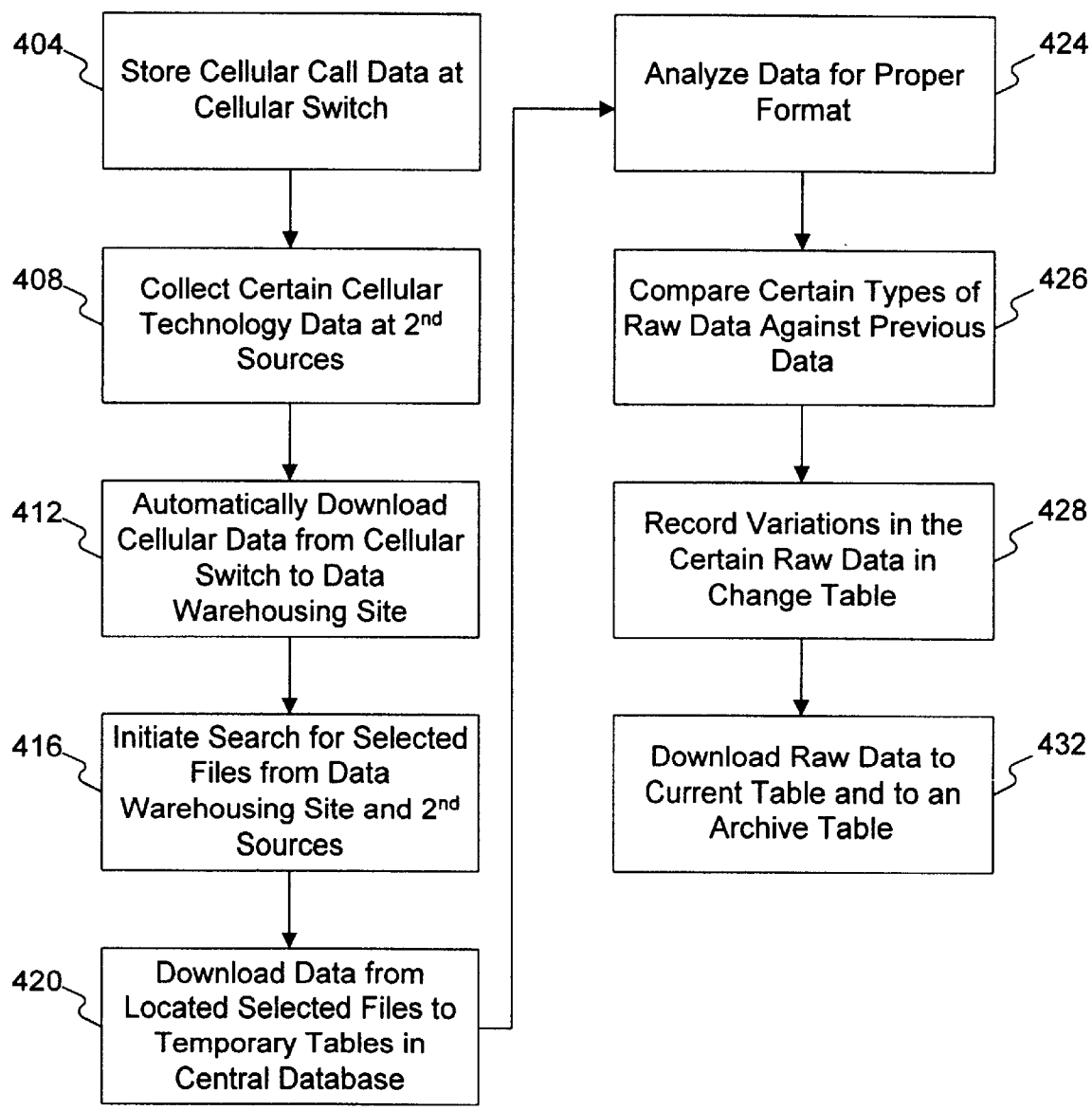
FIG. 4 is a flow diagram of processes used in collecting information for storage in the central database of FIG. 3.

FIG. 4 includes the processes consistent with the present invention for downloading information from cellular switches and providing the information to a centralized storage facility for viewing and analysis by customer service representatives and other telephone company administrators. When a call is placed from a cellular telephone to a destination location, information associated with the communication signals or data packets transmitted from the cellular telephone are received at a cellular switch and is collected in an initial technical format at the cellular switch for later retrieval (step 404). The information collected at the cellular switch is, for example, authentication information and RF fingerprint information as known to those skilled in the art. Other data pertaining to cellular fraud or cellular telephone data to be utilized or stored in the central database may be collected from other sources, such as individual contacts who transfer files to an entity that is responsible for including the external information regarding cellular telephones. Such data may be received from outside sources (step 408), such as cellular companies and third party vendors. The data may be formatted and distributed via e-mail and may be in spreadsheet format. The external files may include data, such as cellular telephone numbers ranges, cellular carriers, and specific fraud technologies.

At certain predetermined times, such as on a specific day of the week at a certain time, scripts may be initiated from the SCP 206 to the cellular switches which cause the cellular switch to download the cellular fraud information to a data warehousing site, such as the cellular switch download database 240 (FIG. 2) at the SCP 206 (step 412). The central cellular information database 250 initiates a search for selected files from the data warehousing site at the SCP 206 and from the external database source, such as the external cellular information database 262, containing files, such as from cellular companies and third party vendors (step 416). The data downloaded to the central cellular information database 250 is stored in temporary tables in the central cellular information database (step 420). If there is an error in retrieving the files from either of the data sources, the error is recorded and the database administrator is notified. Such notification can occur via e-mail. Data retrieved and stored in the temporary tables is analyzed for proper format (step 424). The analysis for format includes verifying the number of fields, data types, and other parameters associated with the cellular data. If the data is not properly formatted, the central cellular information database 250 records an error and a database administrator is notified. Certain types of raw data from the temporary tables, such as (NNBR data) is analyzed to determine if the NNBR data has changed from the previously stored data related to the cellular telephone calls from that region. Variances in the data from the previous update are recorded in a change table 330 (FIG. 3) (step 428). The properly formatted data is downloaded to the current cellular data tables 330*a* and to archive data tables 340 (step 432). With the data stored in the current cellular data tables 330, the older data of the current tables is overwritten with the newly downloaded information. The information stored in the archive tables are maintained for a specific period of time, such as for three months. After the passage of the specified time, the data that has been stored in the archive tables for the specified time is deleted from the database.

Figure 5A:
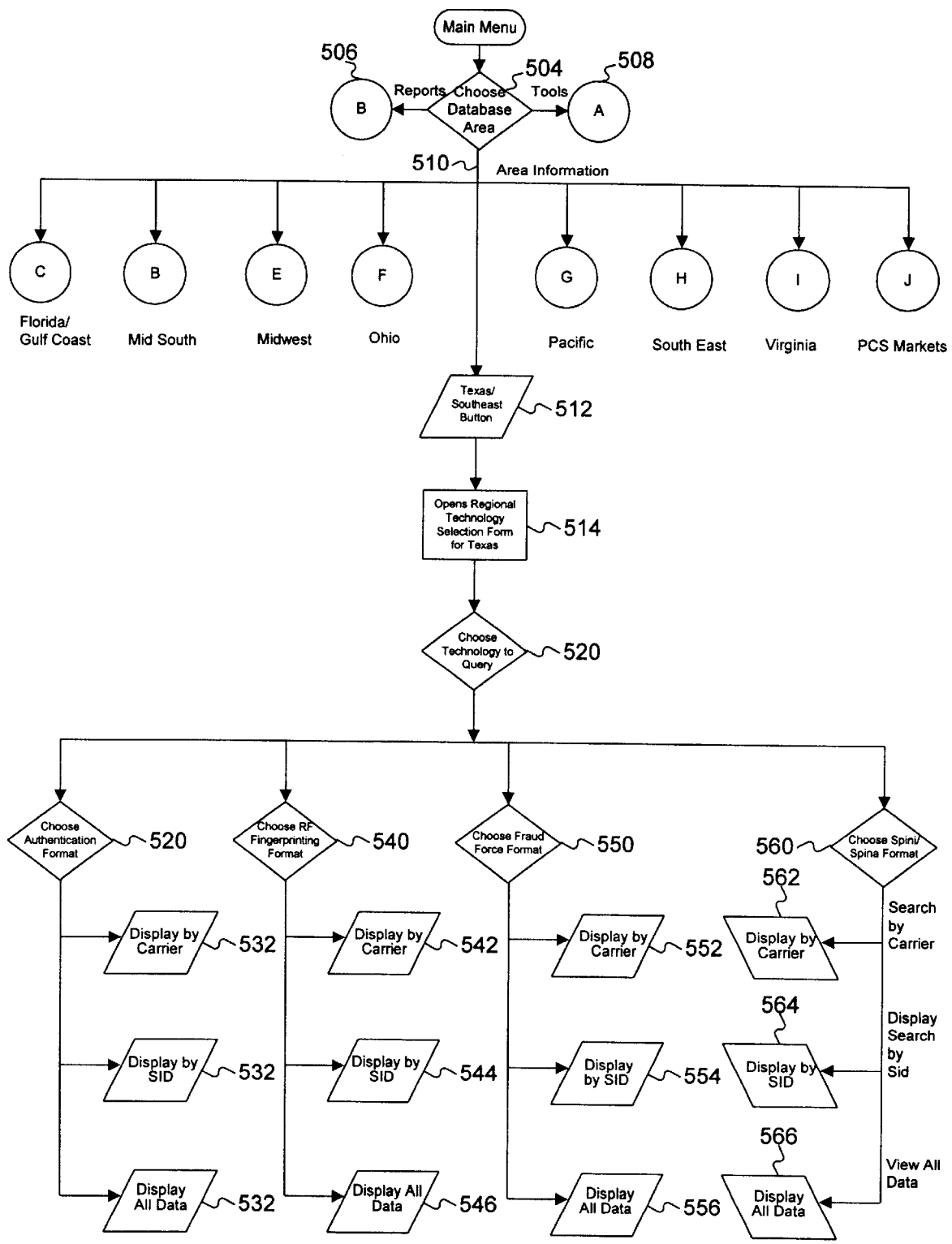
FIGS. 5a, 5b, 6 and 7 are flow diagrams of processes used in retrieving information from the central database of FIG. 3 for display.

As noted above, one of the advantageous features of the present invention is that information from cellular telephone switches is automatically downloaded and automatically formatted for storage in a central location from various telephone networks of different geographic regions. FIG. 5 shows a flow diagram of the options available to a user for searching or utilizing the data stored in the centralized database. The user is generally presented with three options, an option for selecting area information, tools, or reports. The user may select (step 504) either the reports option (step 506), the tools option (step 508), or select from area information options (step 510). If the user selects an area information option (step 510), such as a Texas southeast region (step 512), a regional technology selection for "Texas" is opened (step 514). It should be appreciated that under the other regions illustrated data from those regions may be accessed from the central cellular information database 250 and displayed as discussed in connection with the "Texas" region. The user may choose a technology to query (step 520), such as authentication, RF fingerprint, fraud force, and SPINA/SPINI (Subscriber Pin Intercept/Subscriber Pin Access). After the user selects a particular option, the user is presented with a choice of selecting a particular format for viewing the information contained in the tables for the technology option selected (steps 530, 540, 550, and 560). It should also be appreciated that different subsets of options discussed in connection with the "Texas region" may be presented when the other regions are selected. Under each option, authentication, RF fingerprint, fraud force, or SPINA/SPINI, the user may select search by carrier for each of these options (steps 532, 542, 552, and 562, respectively). The user may also select under these options to display information by system identification (SID) (step 534, 544, 554, or 562) or may select "view all" data (step 536, 546, 556, or 566) under the respective option selected.

The information selected under the area information (step 510) is primarily used by customer contact departments and users. All information is relayed to the user in the same format regardless of the region selected by the user. The authentication information indicates who is authenticating cellular signals with respect to the specified market or region and fraud force information identifies the queries for which fraud force is deployed. The RF fingerprinting information indicates which carriers are sharing the RF fingerprinting for the specified market and the SPINA information indicates which carriers deploy SPINA, and SPINI for the specified market. After selecting these options (step 530, 540, 550, or 560), the user has three choices to sort information: (i) search by carrier, in which the user can search for a specific carrier that has deployed a particular technology; (ii) search by SID, where the user can search for a specific SID that a technology has been deployed in; or (iii) view all data, in which the user can choose to view all the data that is related to the geographic area.

Figure 5B:
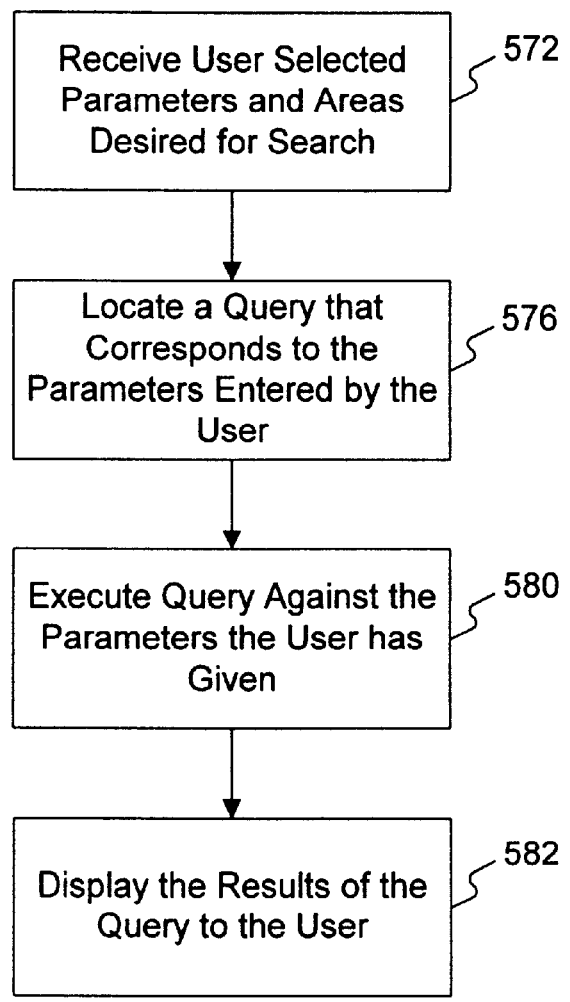

Referring to FIG. 5b, the processes implemented when the query option is selected is discussed. When a user selects the query option 520, the user is asked to enter parameters that the user desires for the query. These parameters are compared against queries stored in the query tables to locate a query that corresponds to the parameters entered by the user (step 576). The query located that corresponds to the parameters is executed (step 580) and the results of the query are displayed to the user (step 582).

Figure 6:
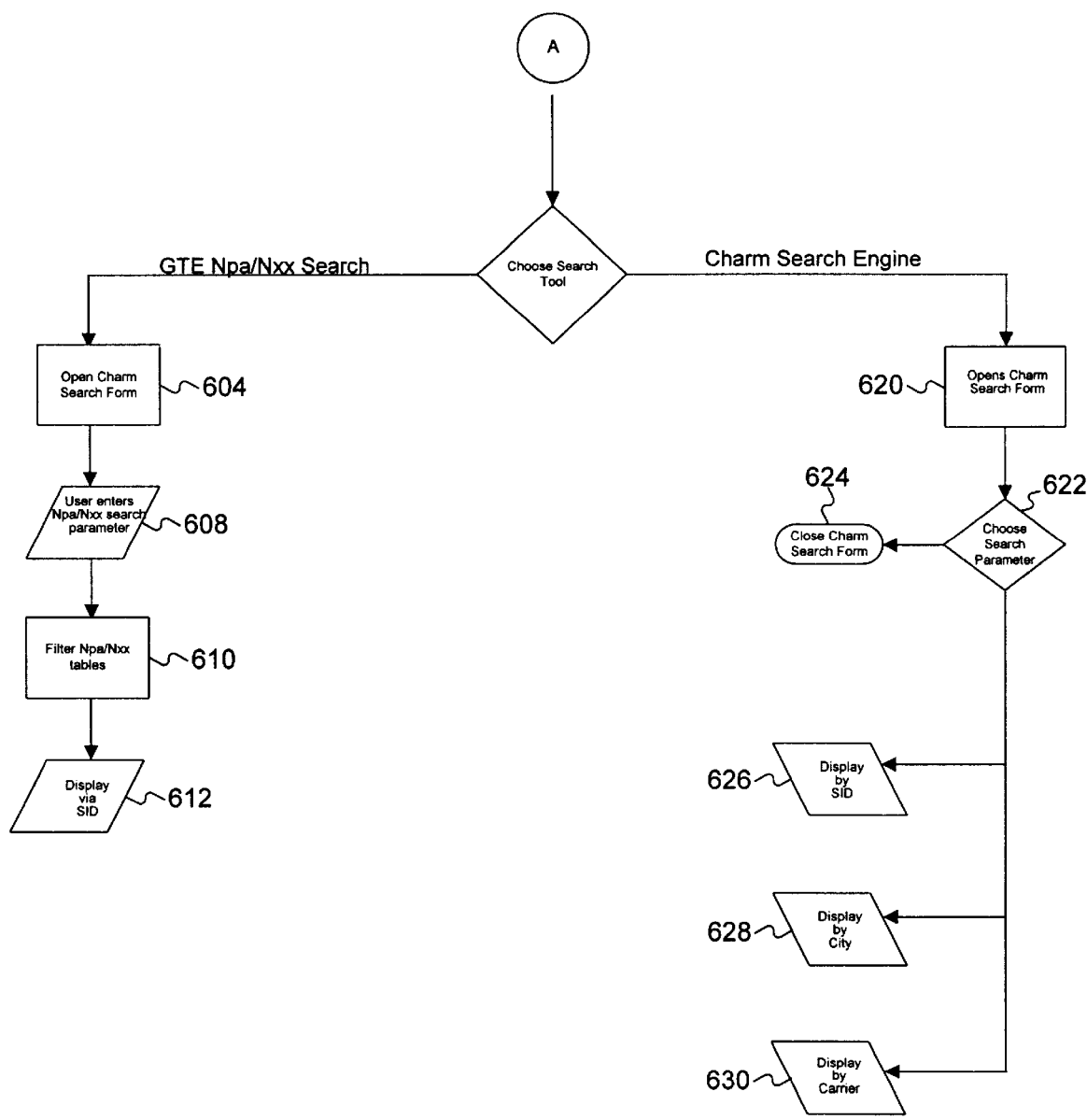

Referring to FIG. 6, the processes consistent with the present invention that may be executed when the tools option (step 508) is selected is illustrated. The tools option (step 508) enables users to identify resources to aid the user in locating specific cellular information, such as CHARM and NPA/NXX. CHARM is an industry wide report that provides information regarding the specific telephone prefixes (NPA/NXX) and line ranges, system ID, and city that belong to each wireless carrier. The tools options are primarily used by customer contact departments and users. The tools menu aids customer contact users in determining specific information regarding their customer database. The choices presented are a CHARM search engine or NPA/NXX search engine (step 602). If the NPA/NXX search option is selected, a CHARM search form is opened (step 604) and the user may enter an NPA/NXX search parameter (step 608). The NPA/NXX tables are filtered (step 610) and the filtered data is displayed through SID lookup forms (step 612). Instead of displaying all the data located on the table, the user enters a parameter that filters this data to present only selected data. The NPA/NXX search engine helps the users identify and expand on specific information about cellular telephone ranges within the telephone company's customer base. The user is requested to input an NPA/NXX (e.g., 813–610). The results of the search will display information about the NPA/NXX such as the market it is assigned to, the line number range for the NPA/NXX and the cellular computer switch that the NPA/NXX resides in.

If the user selects the CHARM engine option, a CHARM search form is opened (step 620). The user may enter a CHARM search parameter (step 622) and the CHARM search form is closed if the parameter does not exist in the database (step 622). The results of a CHARM search may be displayed by SID (step 626), by city (step 628), or by carrier (step 630). The CHARM search engine provides more specific information about cellular providers. Users can input a known variable and the results would be information relating to that variable. Input criteria is SID, carrier name or city. The output is carrier-specific information, such as SID, carrier name, carrier serving city or market, state, band, and contact information.

Figure 7:
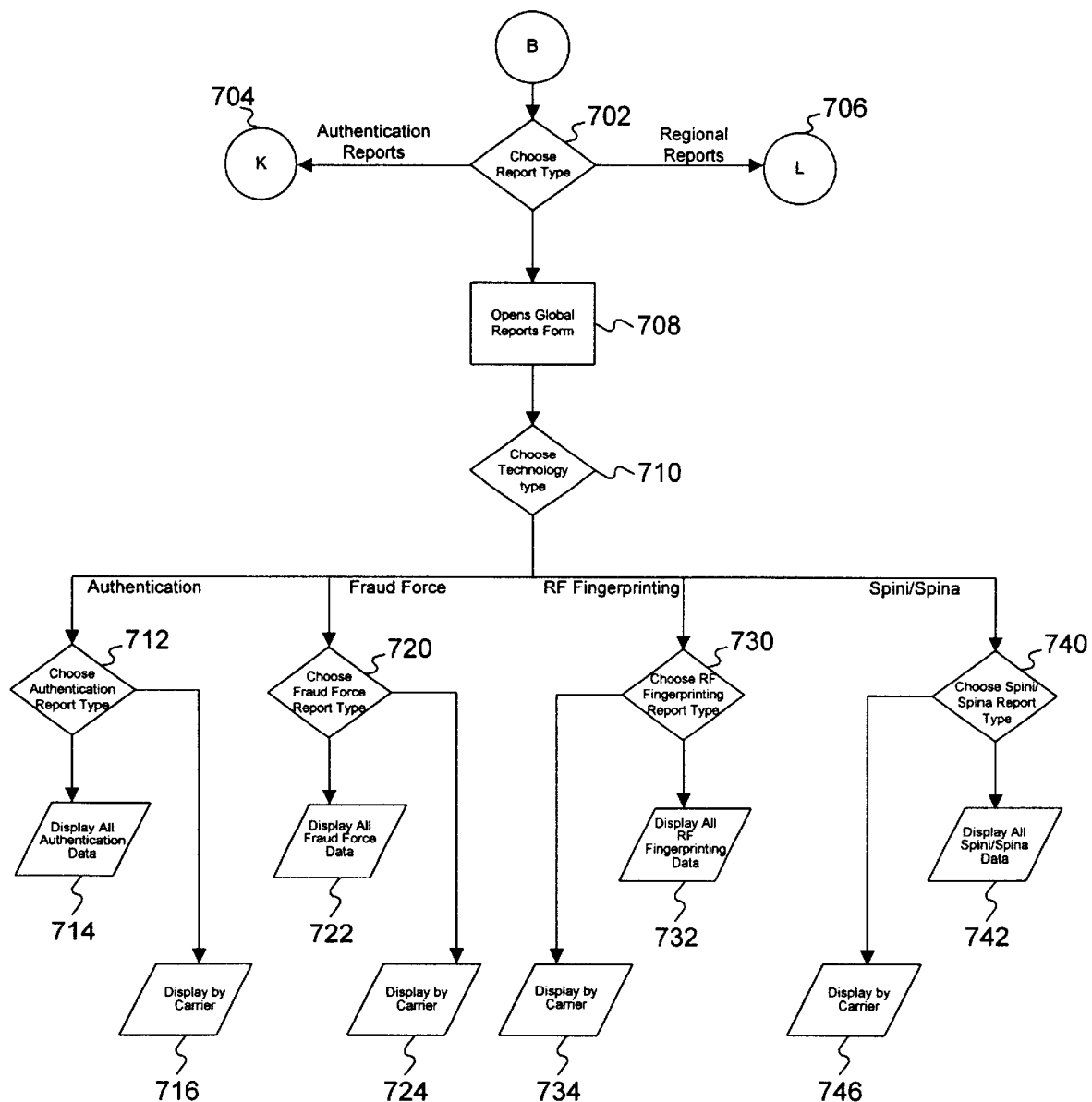

Referring to FIG. 7, the reports available to a user when the user selects the reports options are illustrated. The user may choose from three options (step 702) for reports, namely an authentication report option 704, a regional report option 706, and a global report option 708. The global report option contains company-wide fraud technology deployments and groups all geographic regions into reports associated with the technology area. The global option (step 708) enables users to get a view of the entire cellular technology deployments of the telephone service provider/company. The regional reports option contains market specific data related to the particular region. Users may select the region for which the user has interest and may select a particular technology within that region. The result of the reports contains information for the particular region/technology in an easy to read format. The authentication report displays authentication statistics for a region, such as the telephone company penetration rates and percentage levels of customers that are using authentication technologies. Although only the steps associated with the global report option are illustrated, it should be appreciated that like or similar steps pertinent to authentication and regional reports are provided.

When the global reports option is selected (step 702), a global reports form (step 708) is opened. The user may then select the technology type (step 710) and the technology type, such as authentication, fraud force, RF fingerprinting, or SPINI/SPINA may be chosen. When an option, such as the authentication option, fraud force option, RF fingerprinting option, or SPINI/SPINA option is chosen (steps 712, 720, 730, or 740, respectively), the user may select to view a specific carrier for each of the options and the appropriate form and filtered data will be displayed for authentication, fraud force, RF fingerprinting, or SPINI/SPINA (steps 716, 724, 734, or 746, respectively). The user may also select under the authentication, fraud force, RF fingerprinting, SPINI/SPINA options whether all markets for the information is to be viewed and filtered (steps 714, 722, 732, or 742, respectively). The reports options are typically used by management and other personnel to relay vital statistical information in a variety of ways regarding fraud technology deployments. The format of this information should be an easy-to-understand format. The information from these reports may be pulled and sorted from multiple market areas.

Thus, by use of a system consistent with the present invention, higher level users, such as managers and administrators may access cellular information derived from cellular switches that may not otherwise be easy to obtain. Thus, the reports and tools that are available to them provide an improved capacity to analyze and assist with the deployment of new and standard fraud technologies for cellular systems. A system consistent with the present invention simplifies and accelerates the process of collecting and maintaining data regarding cellular technologies and allowing for accurate and efficient updating of sensitive or important cellular information. Additionally, the centralized database contains integrity checks and has a standard form and procedure for retrieving information from the various regions which results from a central and reliable database.

It will be understood by those skilled in the art that various changes and modifications may be made, and equivalents may be substituted for elements thereof without departing from the true scope of the invention. Modifications may be made to adapt a particular element, technique, or implementation to the teachings of the present invention without departing from the spirit of the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of memory. Therefore, it is intended that this invention not be limited to the particular embodiment and method disclosed herein, but that the invention includes all embodiments falling within the scope of the appended claims.

What is claimed is:

1. A method for consolidating cellular telephone data from telephone networks deployed in different geographic regions, said cellular telephone data being associated with cellular telephone calls, said method comprising the steps of:

automatically downloading, at service control points for said telephone networks, said cellular telephone data at predetermined time periods, said cellular telephone data being collected at a plurality of cellular switches in communication with said service control points, said cellular telephone data pertaining to cellular calls routed through said cellular switches, and said telephone networks having different types of said cellular telephone data based on different types of cellular technology deployed in said different geographic regions;

selectively choosing said cellular telephone data for storage in a central database of a service management system for said telephone networks, said service management system being in communication with each of said service control points; and reformatting said cellular telephone data for placement in tables in said central database so that said cellular telephone data from said each of said telephone networks is consolidated in said central database, said tables having a format that enables said cellular telephone data to be selectively chosen for inclusion in various documents that summarize said cellular telephone data that is downloaded.

2. The method of claim 1 wherein said step of automatically downloading comprises:

automatically downloading said cellular telephone data to a temporary data storage facility; and searching said temporary data storage facility for files that contain information that is to be stored in said central database.

3. The method of claim 2 further comprising the steps of:

retrieving said information from said temporary data storage facility;

storing said information in a temporary location; and determining whether said information stored in said temporary storage facility is formatted properly.

4. The method of claim 3 further comprising the step of storing information that is determined to be formatted properly to cellular information tables in said central database.

5. The method of claim 4 further comprising the steps of:

determining if said information that is determined to be formatted properly represents changes to data that was previously stored in said cellular information tables; and storing changed information in changed information tables.

6. The method of claim 5 further comprising the step of storing said properly formatted information in archive tables.

7. The method of claim 4 comprising displaying said information contained in said cellular information tables to a display in response to a request initiated by a user.

8. The method of claim 7 comprising the steps of:

comparing said request to queries stored in query tables stored in said central database;

selecting a query that corresponds to said request;

searching said tables with said query; and displaying said information contained in said properly formatted tables that correspond to said query.

9. A computer readable medium having instructions, which when executed by a computer system, perform the steps of:

periodically retrieving raw cellular telephone call information collected at each of a plurality of cellular telephone switches associated with telephone networks deployed in different geographic regions, said telephone networks having different types of said raw cellular telephone call information based on different types of cellular technology deployed in said different geographic regions, said raw cellular telephone call information being previously downloaded by service control points for said telephone networks associated with ones of said cellular telephone switches, and said periodically retrieving step being performed by said computer system at a service management system for said telephone networks, said service management system being in communication with each of said service control points to periodically receive said raw cellular telephone call information;

converting, at said service management system, said raw cellular telephone call information retrieved from said service control points to a second format of information customized for summarizing said raw cellular telephone call information; and storing said second format of information in a central database of said service management system, said central database being accessible by a plurality of users over a computer network.

10. The computer readable medium of claim 9 comprising instructions which when executed by a computer system convert NNBR data to a second format used in displaying the informational content of the NNBR data to a user.

11. The computer readable medium of claim 10 comprising instructions which when executed by a computer system retrieve second cellular call information from an external database source, not associated with switch, and storing the second cellular call information in the second format in the central database.

12. A method, operable from a service management system of a telephone service company, for providing access to cellular telephone data from cellular telephone networks of said telephone service company, said cellular telephone networks being deployed in different geographic regions and in communication with said service management system, said cellular telephone networks having different types of said cellular telephone data based on different types of cellular technology deployed in said different geographic regions, said cellular telephone data being associated with cellular telephone calls, and said method comprising:

periodically receiving, at said service management system, data representing a set of calls within said cellular telephone networks;

consolidating said data in a central database of said service management system;

filtering said consolidated data based on said predetermined search criteria; and permitting a user access to said filtered data.

13. The method of claim 12 wherein the step of periodically receiving data representing calls within a cellular telephone network includes:

storing the received data in at least one temporary storage component.

14. The method of claim 12 wherein:

the method further comprises establishing said predetermined search criteria to include an area information criterion, a tools criterion, and a reports criterion; and the step of filtering includes selecting portions of said consolidated data responsive to one of said area information criterion, said tools criterion, and said reports criterion.

15. The method of claim 12, wherein the step of permitting access to the filtered data includes:

selectively providing a set of reports, each report indicating at least one service aspect associated with said cellular telephone networks, said set of reports including an authentication report, a regional report, and a global report.

16. A telephone service company that consolidates cellular telephone data comprising:

a plurality of telephone networks deployed in different geographic regions, said telephone networks producing different types of cellular telephone data based on different types of cellular technology deployed in said different geographic regions, each of said telephone networks including:

cellular service switching points configured to generate cellular telephone data in a first format, said cellular telephone data pertaining to cellular calls routed through said cellular service switching points; and a service control point in communication with each of said cellular service switching points and configured to automatically download said cellular telephone data collected at said cellular service switching points at predetermined time periods and store said downloaded cellular telephone data in said first format to files in a download database of said service control point; and a service management system in communication with each said service control point for each of said telephone networks, said service management system being configured to initiate a search of said cellular telephone data stored in said download database to retrieve selected files of said cellular telephone data, said service management system being further configured to store said selected files of said cellular telephone data in a second format in a central database that is customized for display of reports that summarize said cellular telephone data collected from said cellular service switching points.

\* \* \* \* \*